United States Patent [19]

Jamison et al.

[11] 3,990,551
[45] Nov. 9, 1976

[54] CABLE GATHERING DEVICE

[75] Inventors: Will B. Jamison, Bethel Park; Francis A. May; William N. Poundstone, both of Pittsburgh, all of Pa.

[73] Assignee: Consolidation Coal Company, Pittsburgh, Pa.

[22] Filed: Nov. 24, 1975

[21] Appl. No.: 634,459

[52] U.S. Cl............................... 191/12 R; 254/175.5
[51] Int. Cl.² ........................................ H02G 11/00
[58] Field of Search........ 191/12 R, 12.2 R, 12.2 A; 105/161; 254/175.5, 138; 226/118; 28/21; 299/30

[56] References Cited
UNITED STATES PATENTS 1,865,069   6/1932   Allen................................ 191/12 R Primary Examiner—Trygve M. Blix
Assistant Examiner—Reinhard J. Eisenzopf
Attorney, Agent, or Firm—William A. Mikesell, Jr.; Stanley J. Price, Jr.

[57] ABSTRACT

A closed compartment for storing multi-conductor electric cable on an electrically powered mobile mining machine is secured to and extends laterally from a sidewall of the vehicle. The storage compartment has a slotted opening in the front portion thereof through which the cable is conveyed. A support frame is secured to the conveyor boom of the vehicle and extends outwardly therefrom and forwardly of the storage compartment. A first traction roller is rotatably mounted and fixed on the support frame between pairs of guide members that serve to direct the cable into the storage compartment. A second traction roller is rotatably mounted in spaced parallel relation above the fixed traction roller and is resiliently supported on the support frame by spring members. The cable passes between the rollers, and the springs maintain the rollers in frictional engagement with the cable. Prime movers, such as hydraulic motors, are drivingly connected to the first and second traction rollers to rotate the rollers in a selected direction to convey the cable into the storage compartment as the vehicle advances toward the power source. When the vehicle stops the pressure of the hydraulic motors is reduced, and the frictional engagement between the rollers and the cable prevents rotation of the rollers and conveyance of the cable. Movement of the vehicle away from the power source exerts a sufficient force upon the cable to reverse rotation of the rollers and feed the cable from the storage compartment at a speed corresponding to the speed of the vehicle. Thus, only that length of cable required to permit operation of the vehicle in the mine is extended from the vehicle with the excess cable stored in a loosely held fashion within the storage compartment.

12 Claims, 3 Drawing Figures

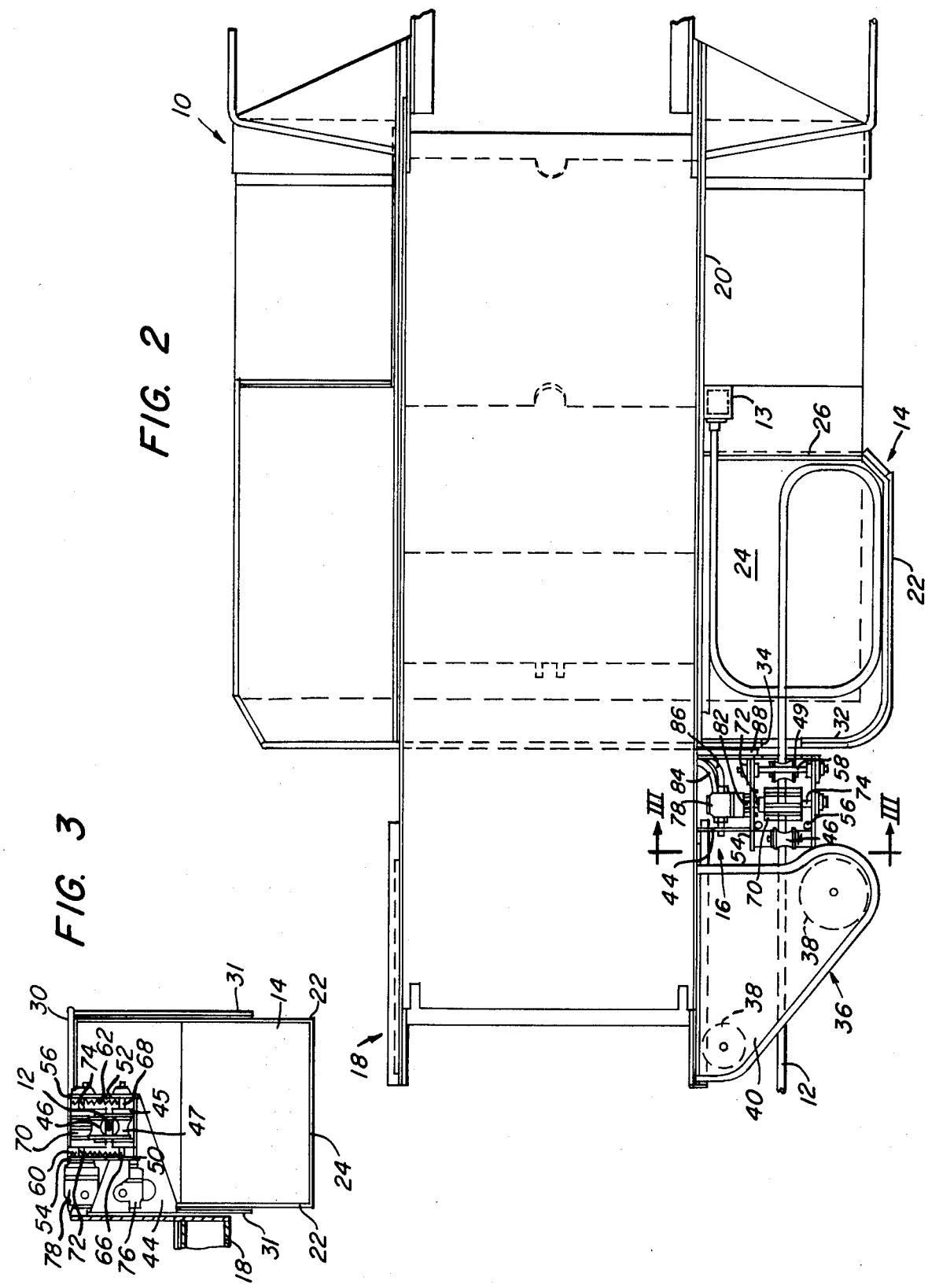

CABLE GATHERING DEVICE

BACKGROUND OF THE INVENTION

1. Field of the Invention

This invention relates to a device for gathering cable on a mining machine and more particularly to a cable gathering device for loosely confining multi-conductor electrical cable in a random configuration within an enclosed storage compartment on the mining machine.

2. Description of the Prior Art

In underground mining the vehicle used to transport the dislodged material from a continuously advancing mining machine to a fixed transportation means, such as a conveyor, is a mobile vehicle propelled by electric motors. A specific example of such an electrically propelled mobile haulage vehicle is a shuttle car which receives power through a single conductor or a multi-conductor trailing cable. The electrical cable is connected at one end to a fixed source of power and at the other end to a cable reel that is rotatably secured to the frame of the vehicle. The conventional cable reel is positioned laterally on one side of the vehicle. A spooling device is provided to uniformly locate the cable on the cable reel as the vehicle advances toward the source of power.

The conventional cable reel and spooling devices are expensive and subject the cable when wound tightly on the reel to excessive side wear which may result in destruction of the cable insulation and the hazard of fire by sparking or arcing across exposed conductors. Furthermore, the tension generated in the cable as it is reeled onto the cable reel tends to weaken the tensile strength of the cable subjecting it to malfunction by parting due to the excessive tensile forces generated especially when the vehicle suddenly changes direction.

Take-up devices for telephone and electric lamp wires or cord which eliminate the need for reel and spooling devices in handling the slack wire are known in the art. U.S. Pat. No. 1,865,069 illustrates and describes an improved take-up device for electric wires, cords and the like which includes a receptacle for storing slack wire for telephone. The wire leads out of the receptacle through an opening and is attached at one end to the telephone. The portion of the wire extending through the opening is frictionally engaged to a pair of co-acting rollers, which rotate by virtue of the frictional engagement with the wire. The rollers are non-rotatably connected through gear members to a spring. Rotation of the rollers through the gear members places the spring under tension when the telephone is lifted and pulled outwardly. When the telephone is again placed on its stand adjacent the storage receptacle the spring rotates the gear members in an opposite direction to, in turn, rotate the rollers and pull the wire inwardly into the receptacle. With this arrangement, the problem of accommodating loose telephone wire or floor lamp cord on the floor is alleviated.

There is need for a cable gathering device to convey cable to and from a mobile mining machine as it is operated in a mine that eliminates the forces exerted upon the cable by the excessive weight of conventional cable reel and spooling devices and surges in tension that occur when a vehicle suddenly changes direction. While it has been suggested by the prior art systems to provide alternatives to cable reels and spools for conveying cable from a receptacle by rollers frictionally engaging the cable, there is need for a cable gathering device that selectively conveys the cable to and from the storage receptacle to permit movement of the vehicle toward and away from the source of power.

SUMMARY OF THE INVENTION

In accordance with the present invention there is provided a device for gathering cable on a mining machine that includes a storage compartment that is mounted on the mining machine. The storage compartment has an opening in the front portion thereof through which the cable passes. A support frame is secured to the body portion or boom of the mining machine and is positioned forwardly of the storage compartment and adjacent to the opening therein. A roller mechanism is mounted on the support frame for frictionally engaging the cable. A resilient device is secured at one end portion to the support frame and at the other end portion to the roller mechanism and is operable to maintain the roller in frictional engagement with the cable. A drive mechanism rotates the roller mechanism frictionally engaged to the cable to convey the cable into the storage compartment. The drive mechanism is mounted on the support frame and is drivingly connected to the roller means.

The roller mechanism includes a first roller that is rotatably supported by a pair of rod members to the support frame between two pairs of front and rear guide members through which the cable passes into the storage compartment. In this manner, the first roller is stationarily positioned on the support frame. A second roller is rotatably supported by a pair of rod members to a portion of the support frame that is mounted for vertical pivotal movement. With this arrangement, the second roller is positioned above and in spaced parallel relation to the first roller and vertically movable toward and away therefrom. The cable passes between the first and second roller on the support frame. The resilient device is connected at one end to the second roller and at the other end to a fixed portion of the support frame to exert a downward force upon the second roller and urge the cable into frictional engagement with the rollers.

Each of the rollers is drivingly connected to the drive mechanism that may include prime movers such as hydraulic motors that are mounted on the support frame and each provided with a rotatable drive shaft. The drive shafts are drivingly connected in a suitable manner to the rollers so that upon actuation of the prime movers the first and second rollers are rotated in a preselected direction to convey the cable, frictionally engaged between the rollers, into the storage compartment. With this arrangement, when the mining machine advances toward the power source, the cable is automatically conveyed into the storage compartment with sufficient tension exerted on the cable to remove unwanted slack in the cable. When the mining machine is stationary and the hydraulic motors are supplied with low pressure, the frictional engagement of the cable between the rollers exceeds the torque of the motor drive shafts and the cable is not conveyed. Accordingly, when the mining machine advances away from the power source, the forward movement overcomes the rotation of the motor drive shafts to reverse the direction of rotation of the rollers so that the cable is conveyed out of the storage compartment.

Accordingly, the principle object of the present invention is to provide a cable gathering device for a mining machine supplied with electrical power through a multi-conductor cable that is gathered and loosely confined within an enclosed storage compartment on the vehicle eliminating the need for conventional cable reel and spooling devices on the vehicle.

Another object of the present invention is to provide a cable gathering device for multi-conductor trailing cable of a shuttle car type mining machine in which the cable is automatically conveyed into and out of a storage compartment on the vehicle by a pair of rollers thereby eliminating the need for conventional cable reel and spooling devices and the wear upon the cable attributed to such devices.

An additional object of the present invention is to provide a device for gathering electrical trailing cable of a mobile mining machine in a storage compartment in a random configuration where the lengths of cable are loosely confined to facilitate cooling of the cable when stored on the machine.

A further object of the present invention is to provide for shuttle type haulage vehicles a cable gathering device which exerts substantially less tension upon the cable than the tension exerted by conventional cable reel and spooling devices on the cable.

These and other objects and advantages of this invention will be more completely described and disclosed in the following specification, the accompanying drawings, and the appended claims.

BRIEF DESCRIPTION OF THE DRAWINGS

FIG. 2 is a top plan view in side elevation of a portion of the shuttle car shown in FIG. 1, illustrating one of the rollers drivingly connected to a prime mover for rotating the roller to convey the electrical cable into the storage compartment with the cover plate thereof shown removed.

FIG. 3 is a sectional view of the cable gathering device taken along line 3—3 of FIG. 2, illustrating the spring loaded traction roller positioned above the stationary traction roller on the support frame.

DESCRIPTION OF THE PREFERRED EMBODIMENTS

Figure 1:
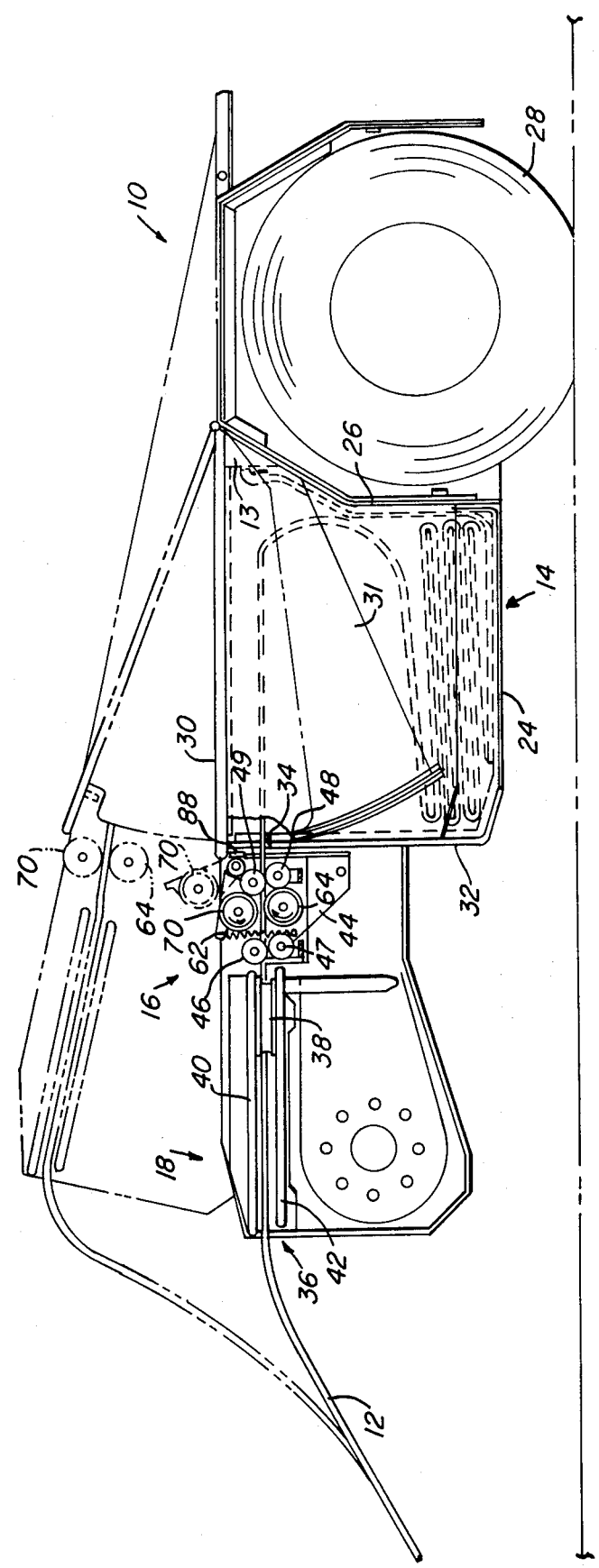
FIG. 1 is a view in side elevation of a portion of a shuttle car, illustrating the device for conveying cable into and out of a storage compartment mounted on the shuttle car in which the cable is loosely confined in a random arrangement.

Referring to the drawings and particularly to FIGS. 1 and 2, there is illustrated the rearward end portion of a shuttle car generally designated by the numeral 10 that is operable to transport mined material from the working face of a mine to a fixed transportion means for conveying the material out of the mine. It should be understood that the reference throughout the specification and claims to a mining machine applies broadly to all vehicles used in the mining operation such as shuttle car type haulage vehicles that receive electric power from a source through a cable. The shuttle car 10 is propelled by an electric motor that receives power through a single conductor or a multi-conductor trailing cable 12 that is connected at one end to a fixed source of power (not shown) and at the other end to an explosion-proof junction box 13 that is positioned within an enclosed cable storage compartment 14. The cable storage compartment 14 is secured to the frame of the shuttle car 10 and is lined with an electrically insulating material. The cable is conveyed into and out of the storage compartment 14 as the shuttle car 10 advances toward and away from the power source by means of the cable gathering device that is generally designated by the numeral 16.

The rearward end portion of the shuttle car 10 includes a conveyor boom portion 18 that supports a conveyor that extends longitudinally on the conveyor boom portion and is operable to discharge the material stored in the shuttle car rearwardly onto a fixed transportation means, such as a conveyor. The boom portion 18 is vertically movable on the shuttle car 10. The shuttle car 10 has a side wall 20 extending longitudinally on opposite sides of the conveyor boom 18. The cable storage compartment 14 is secured to and positioned laterally of the sidewall 20 adjacent the conveyor boom 18 on one side of the vehicle. The storage compartment 14 has a vertically extending sidewall 22 secured to a bottom wall 24 and a rear wall 26 that abuts the fender for wheel 28. The open upper portion of the storage compartment 14 is closed by a cover plate 30 that includes side plates 31 that extend downwardly from the side portions of the cover plate into surrounding relation with the sidewalls 22. The cover plate 30 is hingedly connected to the rear wall 26. A front wall 32 extending upwardly from the bottom wall 24 and secured to the vehicle sidewall 20 has a slotted opening 34 through which the cable 12 extends as it is conveyed into and out of the storage compartment 14 by the cable gathering device 16.

A cable guide support 36 extends laterally from the conveyor boom portion 18 and forwardly of the gathering device 16 in alignment with the slotted opening 34 of the storage compartment 14. The cable guide support 36 has a plurality of rotatably mounted guide sheaves 38 that are secured between a pair of parallel plates 40 and 42 as illustrated in FIG. 2. With this arrangement, the multi-conductor cable 12 is threaded between the parallel plates 40 and 42 and is rotatably supported by the guide sheaves 38 to facilitate the paying out and reeling in of the cable by the gathering device 16.

The cable gathering device 16 as illustrated in FIGS. 1–3 includes a support frame 44 that is bolted to the side portion of the conveyor boom 18 and extends outwardly therefrom. Two pairs of guide members 46–47 and 48–49 are rotatably supported between a pair of spaced parallel mounting plates 45. With this arrangement, the cable 12 is maintained in overlying relation with the support frame 44 as it passes between the pairs of guide members 46–47 and 48–49 and into the slotted opening 34 of compartment 14.

As illustrated in FIG. 3, the guide members 46–47 and 48–49 have a concave surface and when mounted on the support frame 44 form an elliptical opening through which the cable 12 passes. The opening conforms substantially to the cross section of the cable with sufficient area to permit a cable splice to pass through the opening. In addition, the elliptical shape of the opening prevents the cable from turning on end and twisting as it passes between the guide members. Preferably, the guide members are fabricated from an electrically insulating material, such as porcelain.

As illustrated in FIGS. 2 and 3, pairs of parallel spaced vertical plate members 50–52 and 54–56 are mounted on the support frame 44 and positioned laterally of the guide members 46–47 and 48–49. The plate members 50 and 52 are rigidly positioned on the frame 44. The plate members 54 and 56 are positioned above plate members 50 and 52 and as illustrated in FIG. 2 are pivotally connected by shaft 58 to the support frame 44 for vertical pivotal movement relative to plate 50 and 52. Resilient members, such as tension springs 60 and 62, are connected at one end to the front portions of fixed plates 50 and 52 and at the other end to the front portions of movable plates 54 and 56. Releasing the springs 60 and 62 from engagement with the plates 54 and 56 permits vertical pivoting movement of plates 54 and 56 away from plates 50 and 52.

A traction roller 64 is rotatably supported by shafts 66 and 68 to plates 50 and 52. The roller 64 is thus fixed on the frame 44 between the guide members 46-47 and 48-49 below the cable 12. Similarly a traction roller 70 is rotatably supported by shafts 72 and 74 to the movable plates 54 and 56. The tension springs 60 and 62 exert a downward force upon the plates 54 and 56 to urge the roller 70 into abutting relation with the cable positioned therebelow to maintain the cable in frictional engagement with the surface of the traction rollers 64 and 70. As illustrated in FIG. 1, by releasing the springs 60 and 62 from engagement with the plate members 54 and 56, the traction roller 70 may be pivoted upward about the shaft 58 to facilitate an exchange of rollers on the frame 44 or replacement of the cable 12. In addition, as illustrated in FIG. 2, each traction roller 64 and 70 may have a grooved peripheral surface to improve the frictional engagement of the cable 12 with the surface of the rollers 64 and 70. With the above-described arrangement, the movable traction roller 70 is positioned parallel to and spaced from the fixed traction roller 64.

The traction rollers 64 and 70 are separately driven by drive mechanisms 76 and 78 respectively. The drive mechanisms 76 and 78 are prime movers, such as hydraulic motors of the fixed displacement type. Each of the prime movers 76 and 78 are mounted on the support frame 44 and include drive shafts 80 and 82 that are suitably splined or keyed to shafts 66 and 72 of the rollers 64 and 70 respectively. The motors 76 and 78 receive pressurized fluid from a source through conduits 84 and 86, as illustrated in FIG. 2, to rotate the drive shafts 80 and 82 to, in turn, rotate the traction roller 64 in a clockwise direction and the traction roller 70 in a counter-clockwise direction. Preferably the motors operate at a hydraulic pressure in the range between 200 and 450 pounds per square inch from when the car is stopped to maximum speed. In this manner, the cable 12, maintained in frictional engagement with the surface of the rollers, is conveyed into the storage compartment 14.

The hydraulic motors 76 and 78 operate continually to rotate the rollers 64 and 70, as above described, to convey the cable into the storage compartment 14. As the shuttle car 10 advances toward the power source the cable is automatically fed into the compartment 14. A preselected tension is thus maintained on the cable 12 to remove undesirable slack in the cable. When the vehicle comes to a stop, the conveyance of the cable ceases because at low operating pressure the torque produced by the motor drive shafts 80 and 82 is insufficient to overcome the frictional forces between the cable 12 and the surface of the traction rollers 64 and 70. Accordingly, at high speed and when the shuttle car 10 advances away from the power source the forward movement of the car overcomes the torque generated by the motors 76 and 78 to reverse the direction of rotation of the rollers 64 and 70. In this manner, the cable is fed from the compartment 14 with sufficient tension on the cable to eliminate undesirable slack in the cable. Thus, in accordance with the practice of the present invention, the cable 12 is automatically conveyed into and out of the storage compartment 14 as the shuttle car 10 advances toward and away from the power source. Furthermore, the feeding of the cable to and from the shuttle car 10 in this manner eliminates the excessive tensile forces exerted upon the cable as encountered with conventional cable reel and spooling devices especially when the vehicle suddenly changes direction.

As illustrated in FIG. 1, the excess cable is loosely stored in a random fashion within the compartment 14. Consequently, circulation of air around the cable sections promotes cooling of the cable within the compartment 14 as distinguished from storage of the cable by tightly winding the cable upon a conventional reel. Storing cable in this manner not only permits cooling of the cable but also eliminates side wear of the cable insulation that occurs with conventional cable reel and spooling devices by the alternating side thrust exerted upon the cable by the spooling device. Furthermore, cable stored on a cable reel is comparable to a large inductor which generates a magnetic field by the flow of current through the wound cable. The magnetic field induces a transient voltage that may be applied to the machine frame creating a hazardous condition in the mine. The cable gathering device of the present invention eliminates this problem by the random storage of the cable in the compartment 14. In addition, the tension required to gather the cable with the cable gathering device 16 of the present invention is substantially less than the tention exerted upon a cable wound on a reel with the effect of reducing cable malfunction by parting of the tensioned cable.

Referring to FIGS. 1 and 2 of the drawings, there is illustrated an arm member 88 that is welded to and extends outwardly from the side portion of the conveyor boom 18. The end of the cover plate 30 of the storage compartment 14 in closed position extends beyond the arm member 88, as illustrated in FIG. 1. With this arrangement, as the conveyor boom 18 is pivoted upwardly to a discharging position, as illustrated in phantom, the arm member 88 comes in contact with the cover plate 30 to raise the cover plate about its hinged connection to the rear wall 26. The cover plate 30 continues to rise as the boom 18 rises. The cable gathering device 16 is mounted to the boom 18 and therefore moves upwardly with the boom; however, for purposes of illustration only the rollers 64 and 70 are illustrated in the raised position. As the cable is conveyed into the compartment 14 with the boom in raised position, the cover plate 30 deflects the cable downwardly into the compartment. In addition, the side plates 31 serve to confine the cable within the compartment 14.

According to the provisions of the patent statutes, we have explained the principle, preferred construction, and mode of operation of our invention and have illustrated and described what we now consider to represent its best embodiments. However, we desire to have it understood that, within the scope of the appended claims, the invention may be practiced otherwise than as specifically illustrated and described.

We claim:
1. Apparatus for gathering cable on a mining machine comprising, a storage compartment mounted on the mining machine, said storage compartment having an opening in the front portion thereof through which the cable passes, a support frame secured to the body portion of mining machine and positioned forwardly of said storage compartment and adjacent to said opening therein, roller means mounted on said support frame for frictionally engaging the cable, resilient means secured at one end portion to said support frame and at the other end portion to said roller means for maintaining said roller means in frictional engagement with the cable, drive means for rotating said roller means to convey the cable into said storage compartment, and said drive means mounted on said support frame and drivingly connected to said roller means.

2. Apparatus for gathering cable on a mining machine as set forther in claim 1 which includes, said roller means including a first roller rotatably mounted and immovably positioned on said support frame, said first roller having a longitudinal axis extending substantially perpendicular to the direction of travel of the cable, a second roller rotatably mounted on said support frame and supported for vertical movement by said resilient means toward and away from said first roller, said second roller having a longitudinal axis spaced above and positioned parallel to said first roller longitudinal axis to permit positioning of the cable between said first and second rollers, and said resilient means being secured to said second roller for urging said second roller downwardly into contact with the cable such that the cable is frictionally engaged with surfaces of said first and second rollers.

3. Apparatus for gathering cable on a mining machine as set forth in claim 2 which includes, a pair of parallel spaced mounting plates pivotally connected at one end portion to said support frame, said second roller rotatably connected about said longitudinal axis thereof to the other end portion of said pair of mounting plates, and said resilient means releasably connected to said pair of mounting plates to permit pivotal movement of said mounting plates and said second roller in a vertical arcuate path away from said first roller.

4. Apparatus for gathering cable on a mining machine as set forth in claim 2 which includes, said drive means being drivingly connected to said first roller and said second roller to rotate said first and second rollers and convey the cable therebetween and into said storage compartment.

5. Apparatus for gathering cable on a mining machine as set forth in claim 1 which includes, said drive means having prime mover means mounted on said support frame, said prime mover means drivingly connected to said roller means for rotating said roller means to convey the cable being maintained in frictional engagement with said roller means into said storage compartment.

6. Apparatus for gathering cable on a mining machine as set forth in claim 1 which includes, said storage compartment having a cover plate hingedly connected thereto to permit raising of said cover plate relative to said storage compartment, side plates extending downwardly from the side portions of said cover plate and positioned in surrounding relation with the walls of said storage compartment, and arm means secured to and projecting outwardly from the mining machine for raising said cover plate about the hinged connection thereof to facilitate conveyance of the cable into and out of said storage compartment.

7. Apparatus for gathering cable on a mining machine as set forth in claim 1 wherein, said roller means includes first and second rollers, said first and second rollers rotatably mounted in spaced parallel relation on said support frame, said first roller being immovably positioned on said support frame, said second roller being pivotally supported for vertical pivotal movement toward and away from said first roller, said resilient means including a spring member secured at one end portion to said support frame and at the other end portion to said second roller to maintain said pair of rollers in frictional engagement with the cable, and said resilient means releasably connected to said second roller to permit vertical pivotal movement thereof away from said first roller.

8. Apparatus for gathering cable on a mining machine as set forth in claim 7 which includes, said drive means connected to said first and second rollers for rotating said rollers to convey the cable into said storage compartment such that the cable is loosely contained in a random fashion within said storage compartment.

9. Apparatus for gathering cable on a mining machine as set forth in claim 7 which includes, said drive means connected to said first and second rollers for rotating said rollers in a preselected direction such that advancement of the mining machine in one direction conveys the cable out of said storage compartment with a preselected tension being maintained on the cable.

10. Apparatus for gathering cable on a mining machine as set forth in claim 1 which includes, cable guide means mounted on said support frame adjacent said roller means for maintaining the cable in conveying relation with said roller means.

11. Apparatus for gathering cable on a mining machine as set forth in claim 10 which includes, pairs of parallel spaced guide members positioned parallel to said roller means on said support frame, and each of said pairs of guide members rotatably mounted on said support frame in spaced relation to form a passageway through which the cable passes to thereby direct the cable into frictonal engagement with said roller means and into said storage compartment.

12. Apparatus for gathering cable on a mining machine as set forth in claim 11 which includes, said pairs of guide members each fabricated of an electrically insulating material.

* * * * *